(12) United States Patent
Taylor

(10) Patent No.: US 9,254,707 B2
(45) Date of Patent: Feb. 9, 2016

(54) PIPE FITTING LAYOUT SYSTEM

(76) Inventor: Daniel J. Taylor, Mesa, AZ (US)

(*) Notice: Subject to any disclaimer, the term of this patent is extended or adjusted under 35 U.S.C. 154(b) by 106 days.

(21) Appl. No.: 13/585,106

(22) Filed: Aug. 14, 2012

(65) Prior Publication Data
US 2014/0047725 A1    Feb. 20, 2014

(51) Int. Cl.
G01B 5/20    (2006.01)
B43L 13/20   (2006.01)

(52) U.S. Cl.
CPC ........................................ B43L 13/20 (2013.01)

(58) Field of Classification Search
USPC ............ 33/21.3, 529, 412, 514.2, 555.4, 557, 33/561.1, 561.2, 561.3
See application file for complete search history.

(56) References Cited

U.S. PATENT DOCUMENTS

| | | | | |
|---|---|---|---|---|
| 776,713 A * | 12/1904 | Wurts | .............................. | 33/529 |
| 1,647,707 A * | 11/1927 | Mears | .............................. | 33/529 |
| 2,222,127 A * | 11/1940 | Turner | .............................. | 33/529 |
| 2,380,919 A * | 8/1945 | Bugenhagen | ................... | 33/529 |
| 2,615,255 A * | 10/1952 | Rankin | .......................... | 33/529 |
| 2,671,273 A * | 3/1954 | Barnes | ............................. | 33/529 |
| 2,742,706 A * | 4/1956 | Rushing, Jr. | .................... | 33/529 |
| 3,550,278 A * | 12/1970 | Pruett | ............................. | 33/529 |
| 4,419,828 A * | 12/1983 | Farris | ............................. | 33/529 |
| 4,956,924 A * | 9/1990 | Hu | ............................... | 33/561.1 |
| 4,959,909 A * | 10/1990 | Wong | ........................... | 33/561.1 |
| 5,383,282 A * | 1/1995 | Field et al. | ..................... | 33/529 |
| 6,601,312 B1 * | 8/2003 | Phuly | ............................. | 33/529 |

* cited by examiner

Primary Examiner — Christopher Fulton

(57) ABSTRACT

A band of a plurality of link sets is provided wherein each link set comprises a link wherein a first side of such link is bent to form a spring lock, a link wherein a second side of such link is bent to form a spring clip, and a pin extending through the spring lock. The link sets are joined together by inserting the spring lock of one link set into the spring clip of a proximate link set. The band is wrapped around a pipe, the pipe is placed against a second pipe in an orientation in which the pipes are to be joined, the pins are extended from the band to make contact with the second pipe, the band is slid along the length of the pipe until the pins lay above the surface of the pipe, and the contour is marked on the pipe.

7 Claims, 3 Drawing Sheets

PIPE FITTING LAYOUT SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The invention relates to systems and tools related to pipe layout during the pipe fitting process.

2. Description of the Related Art

During the course of pipe fitting, two pieces of pipe are cut and joined together. This joining is typically accomplished by way of welding. The pipes may be easily cut if the desired joint is a butt weld or two pipes being welded together at the ends of each piece to form either a straight piece or an angle with use of modern fabrication equipment. Layout and cutting of the pipes becomes more difficult when dealing with joints that are not straight cuts or straight miters, but are saddle-type joints, branch-type joints, or pipes of differing diameters or cross section shapes.

Methods exist in the prior art for measuring pipe and determining how pipes should be cut prior to welding.

One method which may be employed includes utilizing template sheets which have been preconfigured for particular pipe sizes and angles between the pipes to be joined. These templates may be printed on paper or other medium suitable to act as a stencil, wrapped around the pipe to be cut, and used to transfer the contour of the cut to the pipe. Once the contour is marked on the pipe, the pipe may be cut to the appropriate contour for welding. While this method may work for standard pipe sizes and joint angles, it cannot easily be applied to non-standard pipe sizes or joint angles.

Another method is to employ a computer-aided design (CAD) system to calculate the contour resulting from the joining of two pipes. A contour template may then be printed and applied to the pipe as with the template sheets described above. Once the contour has been transferred to the pipe, the pipe may be cut to the appropriate contour for welding. While this method allows the contour for any joint to be generated and applied, it is time consuming to create the contour in the CAD system and print a single use template. A pipefitter likewise may not have access to a CAD system while working on a particular piping system, making adjustments to the templates impracticable.

Other systems include utilizing a fixed ring fitted with a plurality of pins oriented parallel to the central axis of the ring. The pipefitter places the ring around a first pipe and manually orients the first pipe with a second pipe in the desired configuration for the joint. Once the pipes are oriented, the pipefitter extends the pins from the ring to meet the surface of the second pipe. Upon making contact with the second pipe, the pins form the contour of the joint. The ring may then be raised along the body of the first pipe and used to transfer the contour to the first pipe. Once the contour has been transferred to the pipe, the pipe may be cut to the appropriate contour for welding. While this allows the pipefitter to create contours quickly while on the job site, it is limited in that the ring is fixed in diameter and will fit only a single size of pipe. A pipefitter must utilize multiple tools to fit differing sizes of pipe, and may not be able to utilize this type of tool for pipes of a non-standard cross section.

A solution is needed to address one or more of these shortcomings in the prior art.

BRIEF SUMMARY OF THE INVENTION

The present invention comprises a band of removable link pairs. Each link pair comprises a first link and a second link. These links are each formed from a sheet of material, which is bent to form a curve similar to an "S" curve in its cross section. The sheet of material may be comprised of a metal such as a stainless steel or plastic. The sheet should be rigid enough after formation to act as a spring when its curve is slightly bent.

The sheet for the first link is bent around a substantially circular curve with an inner diameter slightly smaller than the diameter of a removable pin to form a first spring lock. The inner diameter of the first spring lock should be small enough to offer resistance when inserting the removable pin in the spring lock, yet large enough to allow the removable pin to pass through the inner diameter.

The sheet for the first link then bends in the opposite direction of the first spring lock around a substantially circular curve with an inner diameter slightly smaller than the outer diameter of the first spring lock to form a first spring clip. The first spring clip is preferred to be trimmed centered on the first link and spanning approximately one-third to two-thirds the total length of the first link.

The sheet for the second link is bent in substantially the same manner as that of the first link to form a second spring lock and second spring clips. The second spring clips are preferred to be trimmed to create two second spring clips at either end of the second link, with a space between the second spring clips being slightly greater than the length of the first spring clip.

The link pairs are assembled by sliding the second spring lock into the first spring clip. The first spring clip acts to hold the second spring lock in place. Two link pairs may be joined by sliding the first spring lock of a first link pair into the second spring clips of the second link pair. Link pairs are joined together in this fashion until the band has reached a desired length. The last link pair may optionally be joined to the first link pair, creating a loop of link pairs. Removable pins are then inserted through the inner diameter of the spring locks.

In use, a first pipe is placed against a second pipe, oriented in accordance with the desired joint of the two pipes. Once the pipes are placed in their desired orientation, the pipefitter then wraps the band around the first pipe. The band may be wrapped around the first pipe without regard to specific shape or size of the first pipe. Any excess in band length may be removed by separating any excess links from the remainder of the band. The band may then be tightened around the first pipe by utilizing a tightening clamp.

After the band has been wrapped around the first pipe, the pins are extended through the spring locks to make contact with the second pipe. The pins will make contact with the second pipe along the contour of the joint between the pipes after they are joined. This contour may be marked on the second pipe. The band may then be slid along the length of the first pipe until the ends of the pins are above the body of the first pipe. This contour may then be marked along the body of the first pipe.

With the contours marked on the first and second pipes, the pipes may be cut to allow the pipes to be welded together.

DETAILED DESCRIPTION OF THE INVENTION

Figure 1:
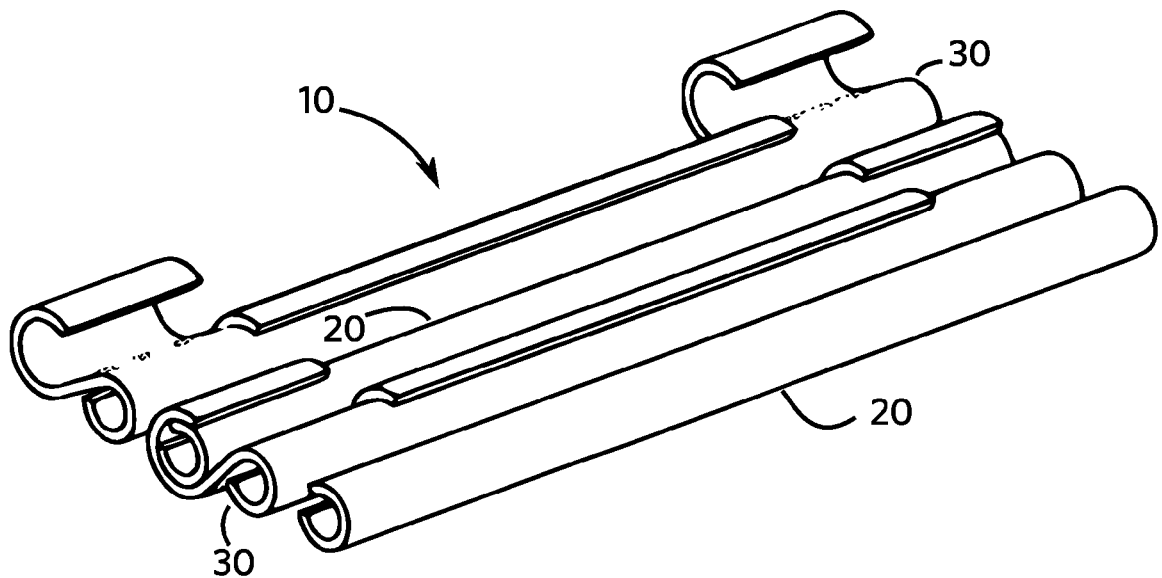
FIG. 1 depicts a band of removable link pairs in a pipe fitting layout system.

Referring now to FIG. 1, the present invention comprises a band 10 of removable link pairs. Each link pair comprises a first link 20 and a second link 30. These links are each formed from a thin sheet of material, which is bent to form a curve similar to an "S" curve in its cross section. This sheet of material may be comprised of a rigid material, such as a stainless steel or plastic. The sheet is preferably between 0.031 inches (0.08 cm) and 0.047 inches (0.12 cm) thick. The sheet should be rigid enough after formation to act as a spring when its curve is slightly bent.

Figure 2A:
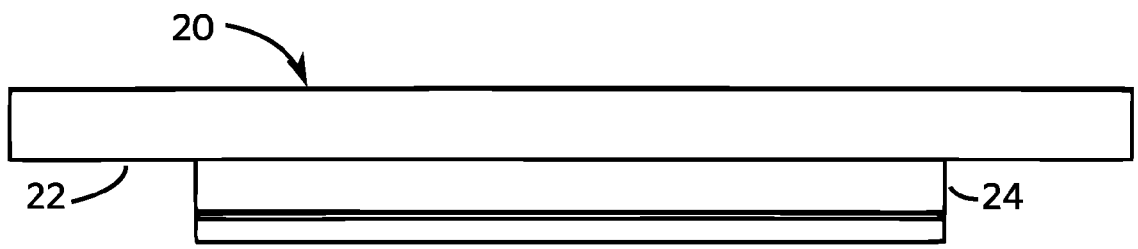
FIG. 2A depicts a top view of a first link in the pipe fitting layout system.
Figure 2B:
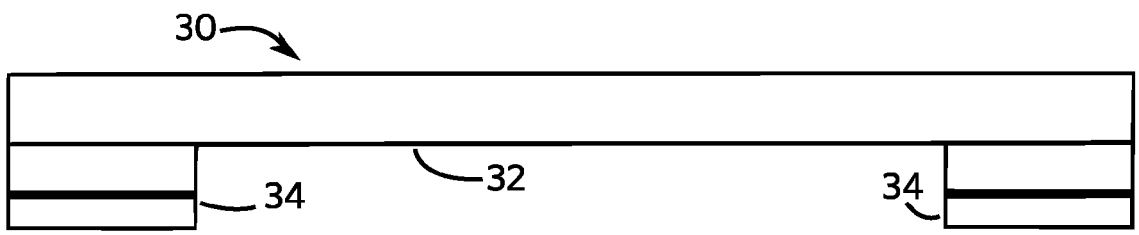
FIG. 2B depicts a top view of a second link in the pipe fitting layout system.
Figure 2C:
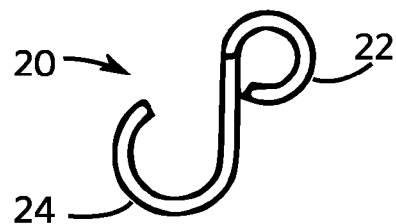
FIG. 2C depicts a profile view of a first link in the pipe fitting layout system.

Referring now to FIGS. 2A and 2C, the sheet for the first link 20 is typically 1.5 inches (3.81 cm) to three inches (7.62 cm) in length. The sheet is bent around a substantially circular curve with an inner diameter slightly smaller than the diameter of a removable pin 40 to form a first spring lock 22. The inner diameter of the first spring lock 22 should be small enough to offer resistance when inserting the removable pin 40 in the spring lock, yet large enough to allow the removable pin 40 to pass through the inner diameter.

The sheet for the first link 20 then bends in the opposite direction of the first spring lock 22 around a substantially circular curve with an inner diameter slightly smaller than the outer diameter of the first spring lock 22 to form a first spring clip 24. The first spring clip 24 is preferred to be trimmed centered on the first link 20 and spanning approximately one-third to two-thirds the total length of the first link 20.

Referring now to FIG. 2B, the sheet for the second link 30 is bent in substantially the same manner as that of the first link 20 to form a second spring lock 32 and second spring clips 34. The second spring clips 34 are preferred to be trimmed to create two second spring clips 34 at either end of the second link 30, with a space between the second spring clips 34 being slightly greater than the length of the first spring clip 24.

The removable pin 40 is made of a material resistant to bending, typically a metal such as steel. The removable pin 40 typically has a diameter between approximately 0.063 inches (0.16 cm) to 0.125 inches (0.32 cm). The removable pin 40 is typically between eight inches (20.32 cm) and twelve inches (30.48 cm) long.

The link pairs are assembled by sliding the second spring lock 32 into the first spring clip 24. The first spring clip 24 acts to hold the second spring lock 32 in place. Two link pairs may be joined by sliding the first spring lock 22 of a first link pair into the second spring clips 34 of the second link pair. Link pairs are joined together in this fashion until the band 10 has reached a desired length. The last link pair may optionally be joined to the first link pair, creating a loop of link pairs. Removable pins 40 are then inserted through the inner diameter of the spring locks 22, 32.

Figure 3:
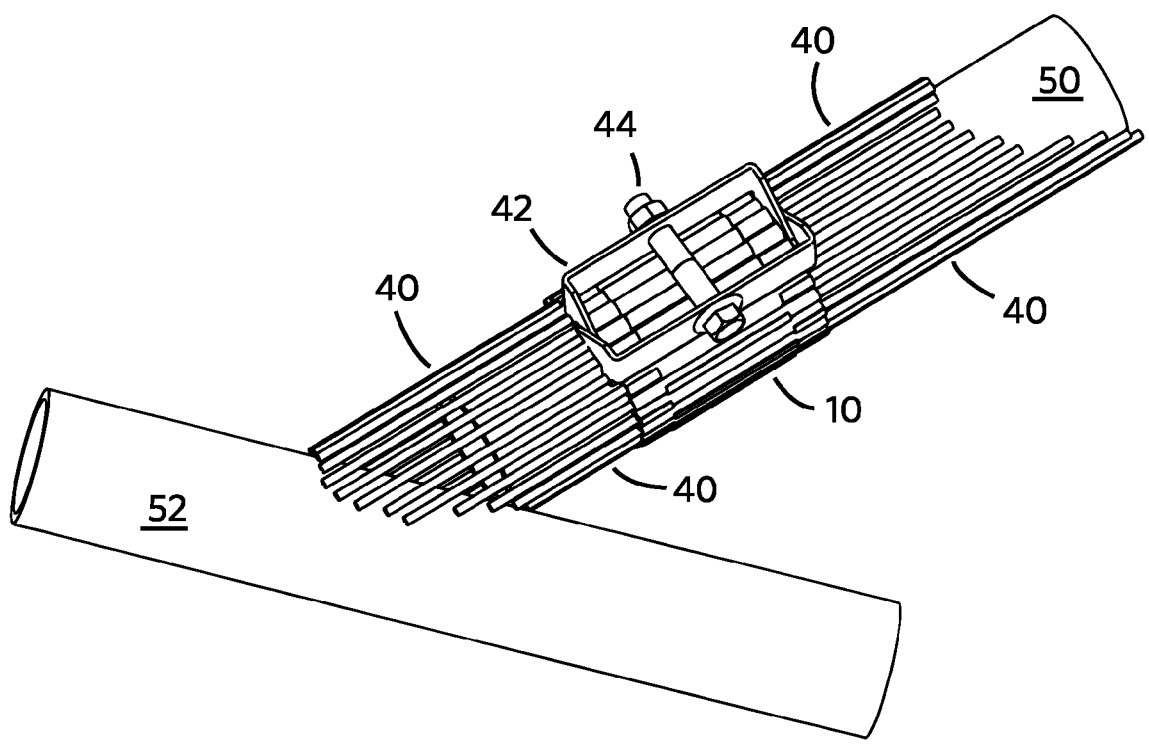
FIG. 3 depicts the pipe fitting layout system in use.

Referring now to FIG. 3, in use, a pipefitter may wrap the band 10 around a first pipe 50 designated to be joined to a second pipe 52. The band 10 may be wrapped around the first pipe 50 without regard to specific shape or size of the first pipe 50. Any excess in band 10 length may hang loosely from the side of the pipe without inhibiting its function.

Any excess in band 10 length may be removed by separating any excess links 20, 30 from the remainder of the band 10. The band 10 may then be tightened around the first pipe 50 by utilizing a tightening clamp 42.

After the band 10 has been wrapped around the first pipe 50, the first pipe 50 is placed against the second pipe 52, oriented in accordance with the desired joint of the two pipes. Once the pipes are placed in their desired orientation, the pins 40 are extended through the spring locks 22, 32 to make contact with the second pipe 52. The pins 40 will make contact with the second pipe 52 along the contour of the joint between the pipes after they are joined. This contour may be marked on the second pipe 52. The band 10 may then be slid along the length of the first pipe 50 until the ends of the pins 40 are above the body of the first pipe 50. This contour may then be marked along the body of the first pipe 50. With the contours marked on the first pipe 50 and the second pipe 52, the pipes may be cut to allow the pipes to be welded together.

Figures 4A, 4B:
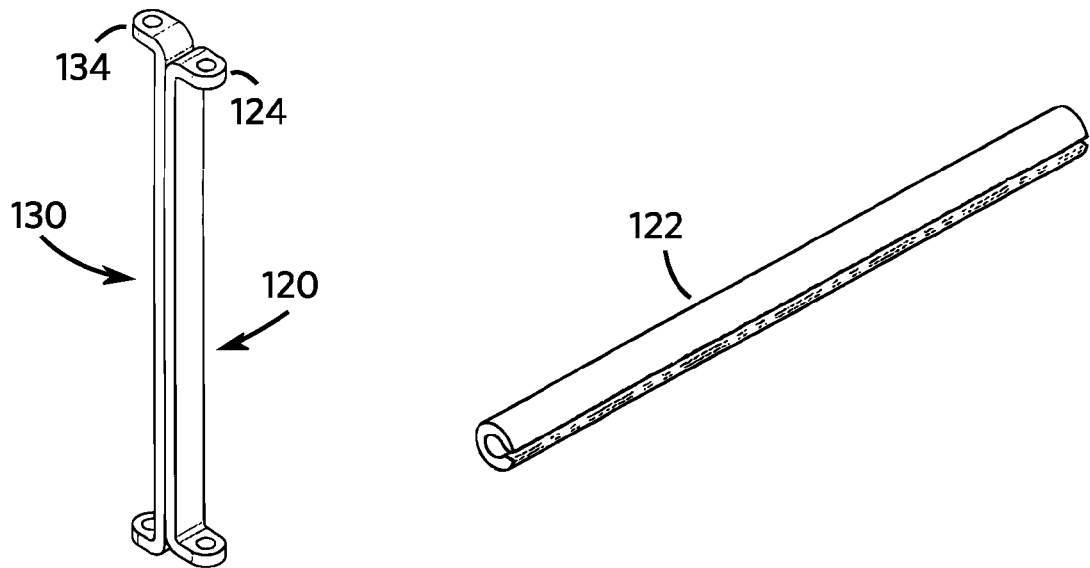
FIG. 4A depicts a perspective view of an alternate embodiment of removable link pairs in a pipe fitting layout system.
FIG. 4B depicts a perspective view of a spring lock in an alternate embodiment of a pipe fitting layout system.

Referring now to FIG. 4A, an alternate embodiment of the pipe fitting layout system comprises a first link 120 and a second link 130. The first link 120 is formed of a rigid material, such as stainless steel or plastic, which is bent on each end to form tabs 124 on each end. A coaxial hole is drilled or punched in each of the tabs 124 of a diameter sufficient to allow pins 40 to pass through.

The second link 130 is formed in the same manner as the first link 120, forming tabs 134 on each end of the second link 130. The first link 120 and the second link 130 are attached to form a link pair.

Referring now to FIG. 4B, a spring lock 122 is formed of a substantially rigid material, such as steel, plastic, or hardened rubber. The spring lock 122 is substantially in the form of a hollow cylindrical in shape, with a slit parallel to the axis of the cylinder extending along the body of the spring lock 122.

Figure 5:
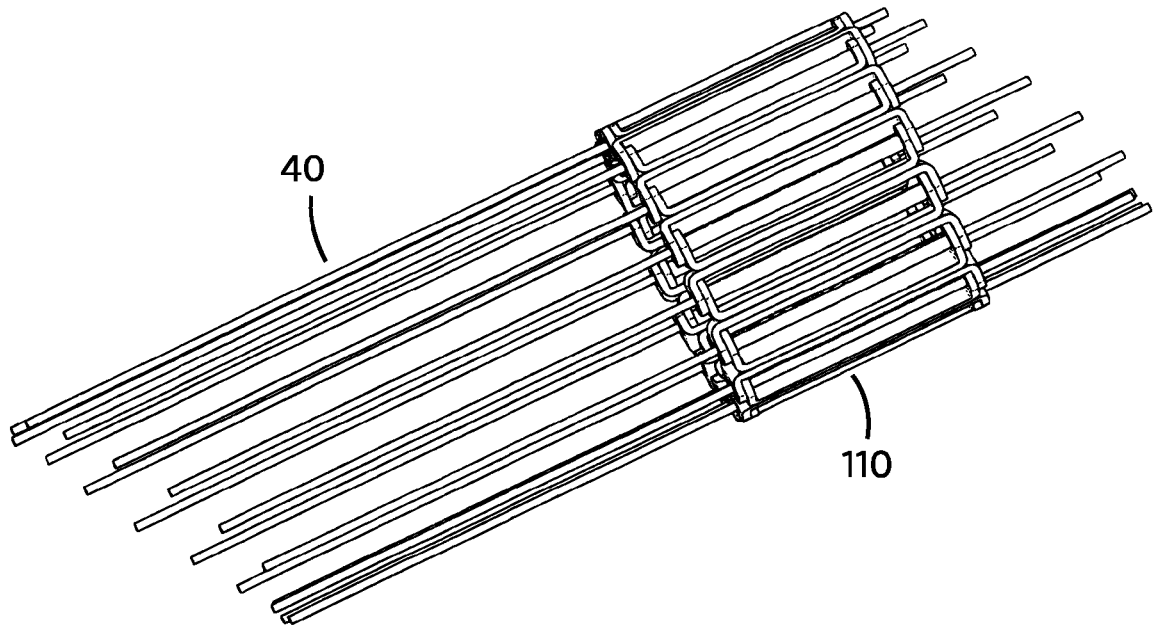
FIG. 5 depicts an alternate embodiment of a pipe fitting layout system in use.

Referring now to FIG. 5, a band 110 is formed by attaching link sets together. The first link 120 of a first spring set is inserted into the second link 130 of a second spring set. A pin 40 is passed through the hole in the second link 130, first link 120, and a spring lock 122. This process is continued until a band 110 is formed in either a closed loop, or fit with a tightening clamp 42.

Use for this alternate embodiment is similarly executed as in other embodiments.

It should be understood that while this disclosure specifically discusses the welding of pipes, the same system may be used for the cutting and welding of pipes, channels, pans, sheets, or other materials which need to be measured, cut, and joined.

I claim:

1. A tool for use in layout of a member to be welded comprising:

(A) a band of a plurality of link sets wherein each link set comprises:
  (i) at least one first link wherein a first side of such first link is bent to form a spring lock of substantially cylindrical shape,
  (ii) at least one second link wherein a side of such second link is bent to form a spring clip, and
  (iii) at least one pin extending through the spring lock;
(B) wherein the plurality of link sets are joined together by inserting the spring lock of one link set into the spring clip of a proximate link set.

2. The tool of claim 1 wherein the spring lock is springedly biased to hold the pin in place.

3. The tool of claim 1 further comprising a tightening clamp.

4. A method for laying out a member to be welded comprising:
(A) providing a band of a plurality of link sets wherein each link set comprises:
  (i) at least one first link wherein a first side of such first link is bent to form a spring lock of substantially cylindrical shape,
  (ii) at least one second link wherein a side of such second link is bent to form a spring clip, and
  (iii) at least one pin extending through the spring lock,
  (iv) wherein the plurality of link sets are joined together by inserting the spring lock of one link set into the spring clip of a proximate link set;
(B) wrapping the band around a first member to be welded;
(C) placing the first member to be welded against a second member to be welded in an orientation in which the first member and second member are desired to be joined;
(D) extending the pins from the band to make contact with the second member;
(E) sliding the band along the length of the first member until the pins lay above the surface of the first member; and
(F) marking the contour designated by the pins on the first member.

5. The method of claim 4 wherein the spring lock is springedly biased to hold the pin in place.

6. The method of claim 4 wherein the band further comprises a tightening clamp.

7. A tool for use in layout of a member to be welded comprising:
(A) a band of a plurality of link sets wherein each link set comprises:
  (i) at least one link comprising at least one first tab set with an annular opening,
  (ii) the at least one link further comprising at least one second tab set with an annular opening,
  (iii) at least one spring lock disposed between the first or the second tab set, and
  (iv) at least one pin extending through the spring lock;
(B) wherein the plurality of link sets are joined together by inserting the pin through the annular opening in the first tab set of one link set, through a spring lock, and through the annular opening in the second tab set of a proximate link set.

* * * * *